US009738285B1

(12) United States Patent
Schang et al.

(10) Patent No.: US 9,738,285 B1
(45) Date of Patent: Aug. 22, 2017

(54) METHOD OF CONTROLLING AN UPSHIFT OF A TRANSMISSION

(71) Applicant: GM GLOBAL TECHNOLOGY OPERATIONS LLC, Detroit, MI (US)

(72) Inventors: Mark A. Schang, Milford, MI (US); Jeffrey M. Kaiser, Highland, MI (US); Jeremy V. Horgan, Northville, MI (US)

(73) Assignee: GM Global Technology Operations LLC, Detroit, MI (US)

(*) Notice: Subject to any disclaimer, the term of this patent is extended or adjusted under 35 U.S.C. 154(b) by 0 days.

(21) Appl. No.: 15/291,100

(22) Filed: Oct. 12, 2016

(51) Int. Cl.
*B60W 10/06* (2006.01)
*B60W 10/11* (2012.01)
*B60W 30/188* (2012.01)
*F02D 17/02* (2006.01)
*F02D 41/02* (2006.01)

(52) U.S. Cl.
CPC ........ *B60W 30/1882* (2013.01); *B60W 10/06* (2013.01); *B60W 10/11* (2013.01); *F02D 17/02* (2013.01); *F02D 41/0225* (2013.01); *B60W 2510/0657* (2013.01); *B60W 2710/1005* (2013.01)

(58) Field of Classification Search
None
See application file for complete search history.

(56) References Cited

U.S. PATENT DOCUMENTS

| 2014/0261315 A1* | 9/2014 | Willard | F02D 17/02 123/349 |
| 2014/0366508 A1* | 12/2014 | Ulrey | F01N 3/04 60/274 |
| 2015/0184599 A1* | 7/2015 | Yokota | B60W 10/11 123/402 |

* cited by examiner

Primary Examiner — Edwin A Young
(74) Attorney, Agent, or Firm — Quinn IP Law

(57) ABSTRACT

A method of controlling a transmission includes determining if an internal combustion engine of the vehicle is currently operating with active fuel management, or if the internal combustion engine is currently operating without active fuel management. The vehicle controller further determines if a possible engine torque is equal to, greater than, or less than a required engine torque. The transmission is upshifted when the internal combustion engine is currently operating with active fuel management, and when the possible engine torque is equal to or greater than the required engine torque. When the possible engine torque is less than the required engine torque, active fuel management is exited so that the internal combustion engine is currently operating without active fuel management. When the internal combustion engine is currently operating without active fuel management, the vehicle controller upshifts the transmission from the current gear ratio to the higher gear ratio.

20 Claims, 1 Drawing Sheet

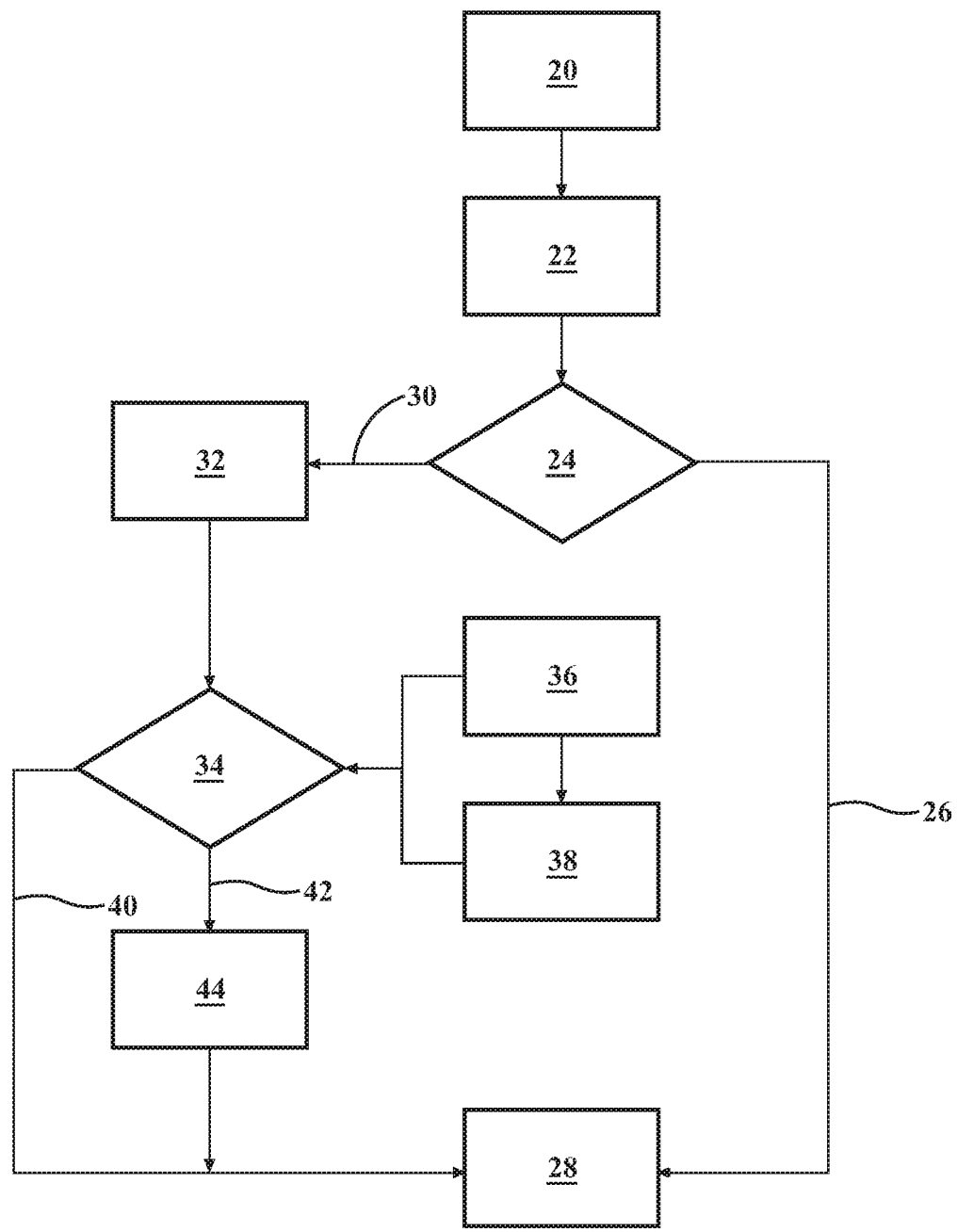

METHOD OF CONTROLLING AN UPSHIFT OF A TRANSMISSION

TECHNICAL FIELD

The disclosure generally relates to a method of controlling a transmission, and more specifically to a method of controlling an upshift of a transmission from a current gear ratio to a higher gear ratio.

BACKGROUND

Many vehicles include a powertrain that is comprised of an engine, multi-speed transmission, and a differential or final drive. The multi-speed transmission includes a number of gear ratios, which increase the overall operating range of the vehicle by permitting the engine to operate through its torque range a number of times. The number of gear ratios that are available in the transmission determines the number of times the engine torque range is repeated. The transmission "upshifts" when it changes to a higher gear ratio, and the transmission "downshifts" when it changes to a lower gear ratio.

Some vehicles are now configured to use active fuel management, in which a portion of a total number of cylinders of the engine may be deactivated under certain circumstances, while the remaining cylinders of the engine continue operation for generating torque. Operation of the engine with active fuel management increases fuel efficiency of the vehicle, but reduces possible torque that the engine may produce because only a portion of the cylinders are being used to generate torque. If the engine is operating with active fuel management when an upshift in the transmission is requested, the engine may not be capable of producing enough torque to maintain the required axle torque, once the gear ratio of the transmission is changed to the higher gear ratio. Upshifting the transmission, when the engine is not capable of producing the required engine torque to maintain the current axle torque in the new, higher gear ratio, such as may occur while the engine is operating with active fuel management, may cause a torque fluctuation, e.g., a sag/surge feeling, that may be felt by the vehicle's occupants.

SUMMARY

A method of controlling a transmission of a vehicle is provided. The method includes determining if an internal combustion engine of the vehicle is currently operating with active fuel management, or if the internal combustion engine is currently operating without active fuel management, with a vehicle controller. Operation of the internal combustion engine with active fuel management includes a portion of a total number of cylinders of the internal combustion engine being deactivated. Operation of the internal combustion engine without active fuel management includes all of the cylinders of the internal combustion engine being active. The vehicle controller further determines a possible engine torque is equal to or greater than a required engine torque, or if the possible engine torque is less than the required engine torque. The possible engine torque is an amount of engine torque that may be produced by the internal combustion engine while the internal combustion engine is currently operating with active fuel management. The required engine torque is an amount of engine torque required from the internal combustion engine to maintain an axle torque when the transmission is upshifted from a current gear ratio to a higher gear ratio. The transmission is upshifted when the internal combustion engine is currently operating with active fuel management, and when the possible engine torque is equal to or greater than the required engine torque. Upshifting the transmission includes changing a gear ratio of the transmission from the current gear ratio to the higher gear ratio. When the possible engine torque is less than the required engine torque, the vehicle controller changes the current operation of the internal combustion engine from operating with active fuel management to operating without active fuel management, so that the internal combustion engine is currently operating without active fuel management. When the internal combustion engine is currently operating without active fuel management, the vehicle controller upshifts the transmission from the current gear ratio to the higher gear ratio.

Accordingly, the method of controlling the upshift of the transmission improves the operation of the vehicle, by providing a smoother, more seamless upshift, when the internal combustion engine is operating with active fuel management and would not be capable of generating the required engine torque necessary to maintain the axle torque, by exiting the active fuel management and operating the internal combustion engine without active fuel management before the upshift is initiated.

The above features and advantages and other features and advantages of the present teachings are readily apparent from the following detailed description of the best modes for carrying out the teachings when taken in connection with the accompanying drawings.

BRIEF DESCRIPTION OF THE DRAWINGS

The FIGURE is a flowchart representing a method of controlling a transmission of a vehicle during an upshift of the transmission.

DETAILED DESCRIPTION

Those having ordinary skill in the art will recognize that terms such as "above," "below," "upward," "downward," "top," "bottom," etc., are used descriptively for the FIGURES, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Referring to the FIGURES, a method of controlling a transmission in response to a requested upshift of the transmission is generally described. The method may be used with vehicles including an internal combustion engine that is operable with Active Fuel Management (AFM). The internal combustion engine may include, but is not limited to, any style and/or configuration of engine that combusts a fuel within a combustion chamber. For example, the internal combustion engine may include, but is not limited to, an in-line style of engine, a V-style of engine, or a rotary style of engine. The internal combustion engine may include any number of cylinders. However, the AFM scheme is particularly useful with eight cylinder engines, in which four cylinders are used to produce torque and four cylinders are deactivated when operating with AFM, and all eight cylinders are used to produce torque when operating without AFM. The internal combustion engine may use any suitable type of fuel, such as but not limited to gasoline, diesel, natural gas, etc.

The internal combustion engine is coupled to the transmission in the normal manner. The transmission may include any style and/or configuration of transmission that is capable of automatically changing between pre-defined gear ratios. For example, the transmission may include, but is not limited to, an automatic transmission, an automatic dual clutch transmission, a continuously variable transmission, etc. The transmission includes at least two different gearings, with each gearing having a different gear ratio. For example, the transmission may include 4, 5, 6, 7, etc., different gearings, with each different gearing having a different gear ratio. As is known, the transmission switches between the different gear ratios to increase the overall operating range of the vehicle by permitting the internal combustion engine to operate through its torque range a number of times. The number of gear ratios that are available in the transmission determines the number of times the engine torque range is repeated. The transmission "upshifts" when it changes from a current gear ratio to a higher gear ratio, and the transmission "downshifts" when it changes from a current gear ratio to a lower gear ratio. The current gear ratio is defined herein as the gear ratio that the transmission is currently operating in.

The transmission includes at least one actuator that is used, activated, and/or engaged to effect the upshift and downshift of the transmission. The actuator may include, but is not limited to, one of a torque transmitting mechanism, such as clutch or a brake, a hydraulic control valve, an electrically actuated control valve, or a linear actuator. It should be appreciated that more than one different actuator may be used to effect an upshift. The specific type, style, and or number of the actuators of the transmission is dependent upon the specific configuration of the transmission. A person skilled in the art will be able to apply the teachings of this disclosure to any suitable transmission.

As used herein, the term "Active Fuel Management" is a system that selectively disengages or deactivates a portion of a total number of cylinders of the internal combustion engine under certain circumstances, while the remaining cylinders of the internal combustion engine continue operation for generating torque. Accordingly, operating the internal combustion engine with AFM includes operating the internal combustion engine with only a portion of the total number of cylinders used to produce torque, whereas operating the internal combustion engine without AFM includes operating the internal combustion engine with all cylinders of the internal combustion engine used to produce torque. The AFM system may include both hardware and software controls necessary to implement the control of the internal combustion engine to activate and/or deactivate the cylinders of the internal combustion engine. The specific actuation and control of the internal combustion engine, with or without AFM, is well known to those skilled in the art, the specifics of which are not pertinent to the teachings of this disclosure. Accordingly, the manner in which the AFM of the internal combustion engine is implemented is not described in detail herein.

The vehicle includes at least one vehicle controller that is operable to control the transmission and/or the internal combustion engine of the vehicle. The vehicle controller may include a single controller, or may include multiple controllers linked together. For example, in one exemplary embodiment, the vehicle controller may include a combination of an engine control module for controlling operation of the internal combustion engine, and a transmission control module for controlling the operation of the transmission. Although the detailed description refers to only a single vehicle controller, it should be appreciated that the steps of the method described below may be implemented by more than one controller, and may be implemented by multiple different vehicle controllers, e.g., the engine control module and the transmission control module.

The vehicle controller is operable to control the operation of the internal combustion engine and the transmission. The vehicle controller may include a computer and/or processor, and include all software, hardware, memory, algorithms, connections, sensors, etc., necessary to manage and control the operation of the internal combustion engine and the transmission. As such, a method, described below and generally shown in the FIGURE, may be embodied as one or more programs and/or algorithms that are operable on the vehicle controller. It should be appreciated that the vehicle controller may include any device capable of analyzing data from various sensors, comparing data, making the necessary decisions required to control the operation of the internal combustion engine and the transmission, and executing the required tasks necessary to control the operation of the internal combustion engine and the transmission.

The vehicle controller may be embodied as one or multiple digital computers or host machines each having one or more processors, read only memory (ROM), random access memory (RAM), electrically-programmable read only memory (EPROM), optical drives, magnetic drives, etc., a high-speed clock, analog-to-digital (A/D) circuitry, digital-to-analog (D/A) circuitry, and any required input/output (I/O) circuitry, I/O devices, and communication interfaces, as well as signal conditioning and buffer electronics.

The computer-readable memory may include any non-transitory/tangible medium which participates in providing data or computer-readable instructions. Memory may be non-volatile or volatile. Non-volatile media may include, for example, optical or magnetic disks and other persistent memory. Example volatile media may include dynamic random access memory (DRAM), which may constitute a main memory. Other examples of embodiments for memory include a floppy, flexible disk, or hard disk, magnetic tape or other magnetic medium, a CD-ROM, DVD, and/or any other optical medium, as well as other possible memory devices such as flash memory.

The vehicle controller includes tangible, non-transitory memory on which are recorded computer-executable instructions, including an upshift control algorithm. The processor of the vehicle controller is configured for executing the upshift control algorithm. The upshift control algorithm implements a method of controlling the transmission and the internal combustion engine in response to a requested upshift.

The method of controlling the transmission is initiated in response to a requested upshift in the gear ratio of the transmission from the current gear ratio to a higher gear ratio. Initiating the upshift is generally indicated by box 20 in the FIGURE. The request of the upshift in the gear ratio of the transmission may be initiated by the vehicle controller itself, or may initiated by another controller and communicated to the vehicle controller. The upshift in gear ratio of the transmission may be requested for any reason, such as but not limited to an increased speed request. The manner in which an upshift in the gear ratio of the transmission is determined and requested is known to those skilled in the art, is not pertinent to the teachings of this disclosure, and is therefore not described in detail herein.

Once the vehicle controller receives or generates the request for the upshift, the vehicle controller then determines a current AFM state. Determining the current AFM state is generally indicated by box 22 in the FIGURE. The current AFM state is one of an AFM not implemented state, AFM fully implemented state, AFM activating state, and AFM deactivating state. The AFM not implemented state is defined herein as continuously operating the internal combustion engine with all cylinder producing torque. The AFM fully implemented state is defined herein as only a portion of the total number of cylinders operating to continuously operating to produce torque. The AFM activating state is defined herein as switching from the AFM not implemented state to the AFM fully implemented state. The AFM deactivating state is defined herein as switching from the AFM fully implemented state to the AFM not implemented state.

Once the vehicle control has determined the current AFM state, the vehicle controller then determines if the internal combustion engine of the vehicle is currently operating with AFM, or if the internal combustion engine is currently operating without AFM. Determining if the internal combustion engine is currently operating with or without AFM is generally indicated by box 24 in the FIGURE. The internal combustion engine is operating with AFM when the current AFM state is one of the AFM fully implemented state, the AFM activating state, or the AFM deactivating state. The internal combustion engine is operating without AFM when the current AFM state is the AFM not implemented state.

If the vehicle controller determines that the internal combustion engine is currently operating without AFM, generally indicated at line 26, the vehicle controller signals the transmission to upshift from the current gear ratio to the higher gear ratio. Upshifting the transmission is generally indicated by box 28 in the FIGURE. As noted above, upshifting the transmission from the current gear ratio to the higher gear ratio may include actuating the actuator in the transmission to effect the upshift.

If the vehicle controller determines that the internal combustion engine is currently operating with AFM, generally indicated at line 30, the vehicle controller delays the requested upshift in the gear ratio of the transmission, and determines if a possible engine torque is equal to or greater than a required engine torque, or if the possible engine torque is less than the required engine torque. Delaying the upshift is generally indicated by box 32 in the FIGURE. Determining if the possible engine torque is less than, equal to, or greater than the required engine torque is generally indicated by box 34 in the FIGURE. The possible engine torque is defined herein as an amount of engine torque that may be produced by the internal combustion engine while the internal combustion engine is currently operating with AFM. The required engine torque is defined herein as an amount of engine torque required from the internal combustion engine to maintain an axle torque when the transmission is upshifted from the current gear ratio to the higher gear ratio. The current axle torque is defined herein as amount of torque that is currently being supplied to a drive axle of the vehicle.

The vehicle controller may calculate and/or determine the possible engine torque and the required engine torque in any suitable manner. Calculating the possible engine torque is generally indicated by box 36 in the FIGURE. Calculating the required engine torque is generally indicated by box 38 in the FIGURE. For example, the vehicle controller may determine and/or calculate the possible engine torque and the required engine torque by first calculating the current axle torque, and then using the current axle torque to determine the possible engine torque and the required engine torque. The current axle torque may be calculated and/or defined in any suitable manner. For example, the current axle torque may be calculated for some other control system of the vehicle, and simply communicated to the vehicle for use in the method described herein. The manner in which the vehicle controller may calculate the current axle torque is well known to those skilled in the art, and is therefore not described in detail herein.

As noted above, the vehicle controller may calculate the possible engine torque and the required engine torque in any suitable manner. For example, the vehicle controller may calculate the possible engine torque based on an empirical or physics based torque model that estimates the maximum torque that could be produced without exiting active fuel management, and hence changing the number of cylinders presently active. Similarly, the vehicle controller may calculate the required engine torque based on the engine torque necessary to maintain the constant axle torque after the upshift has been executed and the transition to the higher gear ratio has been completed.

If the vehicle controller determines that the internal combustion engine is currently operating with AFM, generally indicated at 30, and the possible engine torque is equal to or greater than the required engine torque, generally indicated at line 40, then the vehicle controller signals the transmission to upshift from the current gear ratio to the higher gear ratio. Upshifting the transmission is generally indicated by box 28 in the FIGURE. As noted above, upshifting the transmission from the current gear ratio to the higher gear ratio may include actuating the actuator in the transmission to effect the upshift.

If the vehicle controller determines that the internal combustion engine is currently operating with AFM, generally indicated at line 30, and the possible engine torque is less than the required engine torque, generally indicated at line 42, then the vehicle controller changes the current operation of the internal combustion engine from operating with AFM to operating without AFM, so that the internal combustion engine is currently operating without AFM. Changing the operation of the internal combustion engine to operation without AFM is generally indicated by box 44 in the FIGURE. When the internal combustion engine is currently operating with AFM, and when the possible engine torque is less than the required engine torque, the requested upshift is delayed until after the current operation of the internal combustion engine is changed from operating with AFM to operating without AFM. Once the operation of the internal combustion engine has been changed from operating with AFM to currently operating without AFM, the vehicle controller signals the transmission to upshift from the current gear ratio to the higher gear ratio. Upshifting the transmission is generally indicated by box 28 in the FIGURE.

When the internal combustion engine is operating with AFM, the possible engine torque is limited, and the internal combustion engine may not be able to provide the required engine torque after the upshift to maintain the current axle torque. If the upshift were to be effected with the internal combustion engine operating with AFM, and the internal combustion engine were not able to provide the required engine torque, the vehicle would sag, thereby causing the AFM to be deactivated, and the operation of the internal combustion engine changed to operating without AFM, thereby causing a torque surge to increase the provided torque necessary to maintain the torque request. Such a sag/surge feeling is generally undesirable to occupants of the vehicle. By temporarily delaying the upshift in the gear ratio of the transmission when the internal combustion engine is currently operating with AFM, the vehicle controller may determine if the possible engine torque is sufficient to provide the required engine torque. If it is, then the upshift may be executed without inducing the sag/surge sensation. If the vehicle controller determines that the possible engine torque is not sufficient to provide the required engine torque, then the AFM may be exited, and the internal combustion engine operated without the AFM, so that the possible engine torque is sufficient to provide the required engine torque, after which the upshift may be executed without inducing the sag/surge sensation.

The detailed description and the drawings or FIGURES are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A method of controlling a transmission of a vehicle, the method compromising:
    determining if an internal combustion engine of the vehicle is currently operating with active fuel management, in which a portion of a total number of cylinders of the internal combustion engine are deactivated, or if the internal combustion engine is currently operating without active fuel management, in which all of the cylinders of the internal combustion engine are active, with a vehicle controller;
    determining if a possible engine torque, which is an amount of engine torque that may be produced by the internal combustion engine while the internal combustion engine is currently operating with active fuel management, is equal to or greater than a required engine torque, which is an amount of engine torque required from the internal combustion engine to maintain an axle torque when the transmission is upshifted from a current gear ratio to a higher gear ratio, or if the possible engine torque is less than the required engine torque, with the vehicle controller;
    upshifting the transmission, in which a gear ratio of the transmission is changed from the current gear ratio to the higher gear ratio, when the internal combustion engine is currently operating with active fuel management, and when the possible engine torque is equal to or greater than the required engine torque;
    changing the current operation of the internal combustion engine from operating with active fuel management to operating without active fuel management, when the possible engine torque is less than the required engine torque, so that the internal combustion engine is currently operating without active fuel management; and
    upshifting the transmission from the current gear ratio to the higher gear ratio, when the internal combustion engine is currently operating without active fuel management.

2. The method set forth in claim 1 further comprising determining a current active fuel management state with the vehicle controller, wherein the current active fuel management state is one of an AFM not implemented state, AFM fully implemented state, AFM activating state, and AFM deactivating state, wherein the internal combustion engine is operating with active fuel management when the current active fuel management state is one of the AFM fully implemented state, the AFM activating state, or the AFM deactivating state, and wherein the internal combustion engine is operating without active fuel management when the current active fuel management state is the AFM not implemented state.

3. The method set forth in claim 1 further comprising requesting an upshift in the gear ratio of the transmission from the current gear ratio to the higher gear ratio.

4. The method set forth in claim 3 further comprising delaying the requested upshift in the gear ratio of the transmission when the internal combustion engine is currently operating with active fuel management and when the possible engine torque is less than the required engine torque, until after the current operation of the internal combustion engine is changed from operating with active fuel management to operating without active fuel management.

5. The method set forth in claim 1 further comprising calculating the current axle torque with the vehicle controller.

6. The method set forth in claim 5 further comprising calculating the possible engine torque with the vehicle controller.

7. The method set forth in claim 6 wherein the vehicle controller calculates the possible engine torque based on a torque model that estimates the maximum torque that could be produced without exiting active fuel management.

8. The method set forth in claim 5 further comprising calculating the required engine torque with the vehicle controller.

9. The method set forth in claim 8 wherein the vehicle controller calculates the required engine torque based on the gear ratio of the higher gear ratio and the current axle torque.

10. The method set forth in claim 1 wherein upshifting the transmission from the current gear ratio to the higher gear ratio includes actuating at least one actuator in the transmission to effect the upshift.

11. The method set forth in claim 10 wherein the at least one actuator includes one of a torque transmitting mechanism, a hydraulic control valve, an electrically actuated control valve, or a linear actuator.

12. A method of executing a requested upshift in a transmission of a vehicle, to change a gear ratio of the transmission from a current gear ratio to a higher gear ratio, the method comprising;
    determining if a possible engine torque, which is an amount of engine torque that may be produced by an internal combustion engine while the internal combustion engine is currently operating with active fuel management, is equal to or greater than a required engine torque, which is an amount of engine torque required from the internal combustion engine to maintain an axle torque when the transmission is upshifted from the current gear ratio to the higher gear ratio, or if the possible engine torque is less than the required engine torque, with a vehicle controller;
    changing the current operation of the internal combustion engine from operating with active fuel management to operating without active fuel management, when the possible engine torque is less than the required engine torque, so that the internal combustion engine is currently operating without active fuel management; and
    upshifting the transmission from the current gear ratio to the higher gear ratio, when the internal combustion engine is currently operating without active fuel management.

13. The method set forth in claim 12 further comprising upshifting the transmission when the internal combustion engine is currently operating with active fuel management, and when the possible engine torque is equal to or greater than the required engine torque.

14. The method set forth in claim 12 further comprising determining if the internal combustion engine of the vehicle is currently operating with active fuel management, in which a portion of a total number of cylinders of the internal combustion engine are deactivated, or if the internal combustion engine is currently operating without active fuel management, in which all of the cylinders of the internal combustion engine are active, with the vehicle controller.

15. The method set forth in claim 12 further comprising delaying the requested upshift in the gear ratio of the transmission when the internal combustion engine is currently operating with active fuel management and when the possible engine torque is less than the required engine torque, until after the current operation of the internal combustion engine is changed from operating with active fuel management to operating without active fuel management.

16. The method set forth in claim 12 wherein upshifting the transmission from the current gear ratio to the higher gear ratio includes actuating at least one actuator in the transmission with the vehicle controller to effect the upshift.

17. The method set forth in claim 16 wherein the at least one actuator includes one of a torque transmitting mechanism, a hydraulic control valve, an electrically actuated control valve, or a linear actuator.

18. The method set forth in claim 12 further comprising calculating the current axle torque with the vehicle controller.

19. The method set forth in claim 18 further comprising calculating the possible engine torque, with the vehicle controller, based on a torque model that estimates the maximum torque that could be produced without exiting active fuel management.

20. The method set forth in claim 19 further comprising calculating the required engine torque, with the vehicle controller, based on the gear ratio of the higher gear ratio and the current axle torque.

\* \* \* \* \*